United States Patent
Kravets

(10) Patent No.: US 8,848,833 B2
(45) Date of Patent: Sep. 30, 2014

(54) RECEIVER HAVING CONTROLLER TO SET LOCAL OSCILLATORS SO AS TO RENDER INTERFERING SIGNALS FILTERABLE AND ASSOCIATED METHODS

(75) Inventor: Oleksiy Kravets, Petersburg (CA)

(73) Assignee: BlackBerry Limited, Waterloo, Ontario (CA)

( * ) Notice: Subject to any disclaimer, the term of this patent is extended or adjusted under 35 U.S.C. 154(b) by 600 days.

(21) Appl. No.: 13/227,885

(22) Filed: Sep. 8, 2011

(65) Prior Publication Data
US 2013/0064327 A1    Mar. 14, 2013

(51) Int. Cl.
| H04L 27/38 | (2006.01) |
| H04L 27/06 | (2006.01) |
| H04L 25/08 | (2006.01) |
| H04B 1/00 | (2006.01) |
| H04B 1/28 | (2006.01) |

(52) U.S. Cl.
CPC .......... H04L 27/3863 (2013.01); H04B 1/0007 (2013.01); H04B 1/28 (2013.01)
USPC ............................. 375/316; 375/344; 375/346

(58) Field of Classification Search
USPC ......... 375/285, 316, 319, 326, 344, 346, 350; 455/164.1, 226.1; 329/304, 306, 307
See application file for complete search history.

(56) References Cited

U.S. PATENT DOCUMENTS

| 6,161,004 A * | 12/2000 | Galal et al. ..................... 455/302 |
| 6,356,747 B1 | 3/2002 | Miquel et al. |
| 6,567,654 B1 * | 5/2003 | Coronel Arredondo et al. ........... 455/315 |
| 6,985,710 B1 * | 1/2006 | Margairaz et al. ............ 455/302 |
| 7,272,374 B2 | 9/2007 | Tuttle et al. .................... 455/333 |
| 7,580,692 B2 * | 8/2009 | Kravets .......................... 455/302 |
| 7,664,203 B2 * | 2/2010 | Tu et al. ......................... 375/316 |
| 8,107,908 B2 * | 1/2012 | Darabi ........................ 455/226.1 |
| 8,503,576 B2 * | 8/2013 | Mehrmanesh et al. ........ 375/332 |
| 2004/0082300 A1 * | 4/2004 | Scheck .......................... 455/126 |
| 2005/0143038 A1 * | 6/2005 | Lafleur .......................... 455/296 |

(Continued)

FOREIGN PATENT DOCUMENTS

EP        2568614 A1 *  3/2013

OTHER PUBLICATIONS

Pui-In Mak et al., "A Programmable Switched-Capacitor A-DQS Frequency Downconverter for Two-Step Channel Selection Wireless Receiver", ASIC, 2003, Proceedings, 5th International Conference on Oct. 21-24, 2003, vol. 1, pp. 573-576.

(Continued)

Primary Examiner — Tesfaldet Bocure
(74) Attorney, Agent, or Firm — Allen, Dyer, Doppelt, Milbrath & Gilchrist, P.A.

(57) ABSTRACT

A receiver includes a first local oscillator (LO), with a pair of in-phase and quadrature (IQ) mixers coupled to the first LO and configured to generate complex IQ signals having an IQ imbalance. The receiver also includes a second LO, with a complex mixer coupled to the second LO and configured to mix the complex IQ signals and generate intermediate frequency (IF) signals based thereon. A controller is coupled between the pair of IQ mixers and the complex mixer and configured to set the first LO and the second LO so that the complex IQ signals and an interfering signal generated due to the IQ imbalance of the complex IQ signals have a same sign and non-overlapping bands at an input of the complex mixer.

20 Claims, 4 Drawing Sheets

(56) References Cited

U.S. PATENT DOCUMENTS

| | | | |
|---|---|---|---|
| 2007/0207736 A1* | 9/2007 | Ragan | 455/63.1 |
| 2008/0009261 A1 | 1/2008 | Tuttle et al. | 455/330 |
| 2009/0203338 A1* | 8/2009 | Darabi | 455/226.2 |
| 2009/0270063 A1 | 10/2009 | Tuttle et al. | 455/333 |
| 2010/0159858 A1 | 6/2010 | Dent et al. | 455/131 |
| 2011/0007847 A1* | 1/2011 | O'Keeffe et al. | 375/319 |
| 2012/0269245 A1* | 10/2012 | Mehrmanesh et al. | 375/224 |

OTHER PUBLICATIONS

Tien-Ling Hsieh et al., "An Approach to Interference Detection for Ultra Wideband Radio Systems", *Design, Applications, Integration and Software, 2006 IEEE Dallas. CAS Workshop* on Oct. 2006, pp. 91-94.

\* cited by examiner

RECEIVER HAVING CONTROLLER TO SET LOCAL OSCILLATORS SO AS TO RENDER INTERFERING SIGNALS FILTERABLE AND ASSOCIATED METHODS

TECHNICAL FIELD

The present disclosure relates to the field of receivers, and, more particularly, to low intermediate frequency (low-IF) receivers.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing communications circuitry, including, for example, an RF transmitter, for operational and performance stability at increased power outputs within the relatively limited amount of space available for the communications circuitry.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a receiver may comprise a first local oscillator (LO), with a pair of IQ mixers coupled to the first LO and configured to generate complex IQ signals having an IQ imbalance. The receiver may also include a second LO, with a complex mixer coupled to the second LO and configured to mix the complex IQ signals and generate intermediate frequency (IF) signals based thereon. In addition, a controller may be coupled between the pair of IQ mixers and the complex mixer and may be configured to set the first LO and the second LO so that the complex IQ signals and an interfering signal generated due to the IQ imbalance of the complex IQ signals have a same sign and non-overlapping bands at an input of the complex mixer.

The controller may comprise an interference detector. In addition, the controller may further comprise a signal to noise ratio (SNR) estimator cooperating with the interference detector and coupled downstream of the complex mixer. In some applications, the interference detector may comprise a spectrum density estimator.

At least one analog to digital converter (ADC) may be downstream from the pair of IQ mixers and upstream of the complex mixer. A low noise amplifier may be coupled upstream from the pair of IQ mixers. A low pass filter may be coupled downstream of the second LO. An amplifier may be coupled downstream of the low pass filter. A demodulator coupled downstream of the amplifier.

A method aspect is directed to a method of operating a receiver comprising a pair of IQ mixers coupled to a first local oscillator and configured to generate complex IQ signals having an IQ imbalance, and a complex mixer coupled to a second LO and configured to mix the complex IQ signals and generate intermediate frequency (IF) signals based thereon. The method may include setting the first LO and the second LO so that the complex IQ signals and an interfering signal generated due to the IQ imbalance of the complex IQ signals have a same sign and non-overlapping bands at an input of the complex mixer, using a controller coupled between the pair of IQ mixers and the complex mixer.

Figure 1:
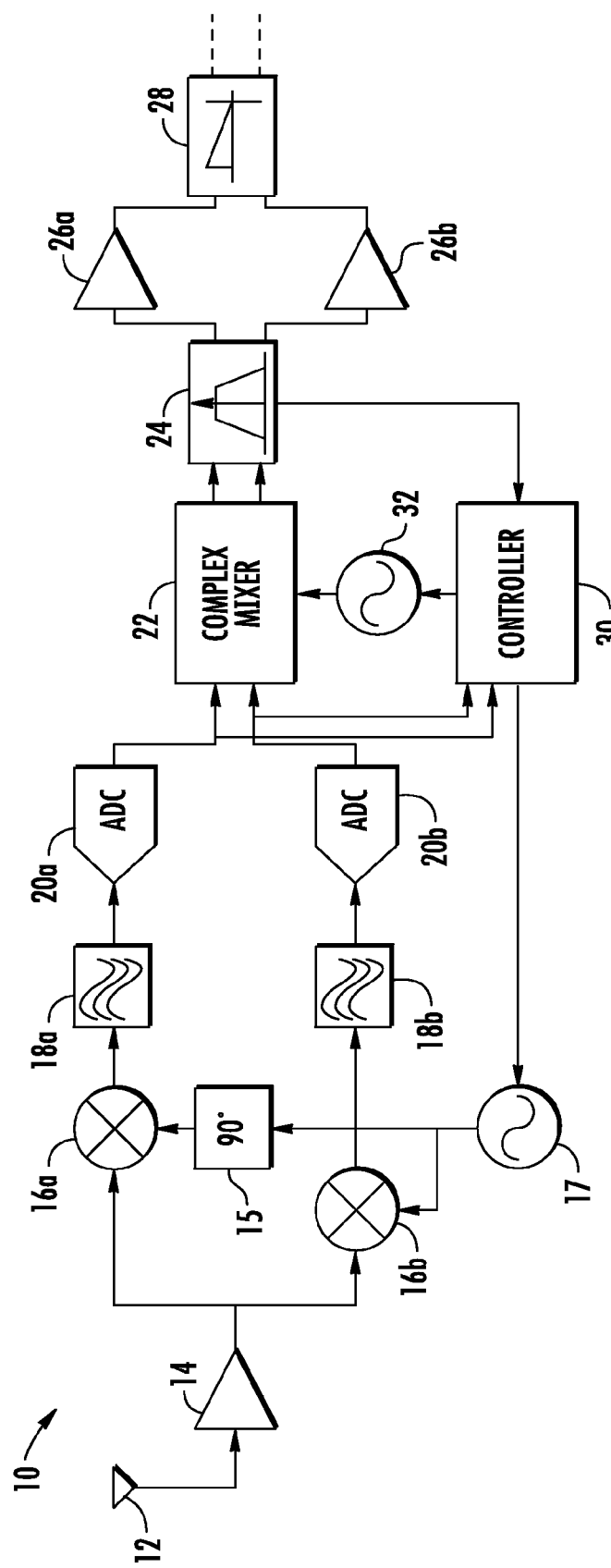
FIG. 1 is a schematic block diagram of a receiver in accordance with the present disclosure.

With reference to FIG. 1, a receiver 10 is now described. The receiver 10 is illustratively a low intermediate frequency (low-IF) receiver, and includes an antenna 12 configured to receive a transmitted signal. The antenna 12 is coupled to a low noise amplifier 14 and passes the received signal thereto as an input signal. Since the received signal may be very low power, the low noise amplifier 14 amplifies the input signal, and passes the input signal to a pair of downconverting mixers 16a, 16b.

A first local oscillator (LO) 17 operating at a first intermediate frequency is coupled to the mixer 16b, and to the mixer 16a through a phase delay block 15. The phase delay block 15 separates the phase of the signal received by the mixers 16a, 16b from the first LO 17 by 90 degrees. This arrangement results in the mixers 16a, 16b driving the input signal to the first intermediate frequency, and separating the input signal into in-phase (I) and quadrature (Q) components, thereby generating a first IF signal, as will be appreciated by those of skill in the art.

While the I and Q components of the signal are ideally 90 degrees apart in phase, in practice, this is difficult to accomplish. Therefore, it can be expected that the I and Q components are close to 90 degrees apart in phase, but not exactly 90 degrees apart. In addition, it can be expected that the amplitude of the I and Q components of the signal are close, but not equal. Thus, there is not only a phase imbalance between the I and Q components of the signal, but also an amplitude imbalance. This situation is referred to as an I-Q imbalance. Mixing in the presence of such an I-Q imbalance results in images of the input signal being created. As will be explained in detail below, the overall design of the receiver 10 seeks to avoid the situation where images of the input signal, in the same band thereof and opposite in sign thereto, are created, although it should appreciated that such images may occur before other portions of the receiver recognize this situation and compensate.

The mixers 16a, 16b are in turn coupled to filters 18a, 18b. The filters 18a, 18b are coupled to analog to digital converters (ADCs) 20a, 20b. The ADCs 20a, 20b are in turn coupled to a complex mixer 22, as well as a controller 30. The controller is coupled to the second LO 32 and the first LO 17. The complex mixer 22 is also coupled to a second local oscillator 32 operating at a second intermediate frequency, which can be referred to as the low intermediate frequency, and therefore drives the input signal to the low intermediate frequency.

A filter 24 is coupled to the complex mixer 22 and the controller 30. The filter 24 is coupled to a pair of amplifiers 26a, 26b, which are in turn coupled to a decoder 28.

Those skilled in the art will appreciate that the ADCs 20a, 20b and filter 24 are coupled to the controller so that the controller can detect interfering signals in the first IF signal, as well as the SNR of the second IF signal.

Figure 3A:
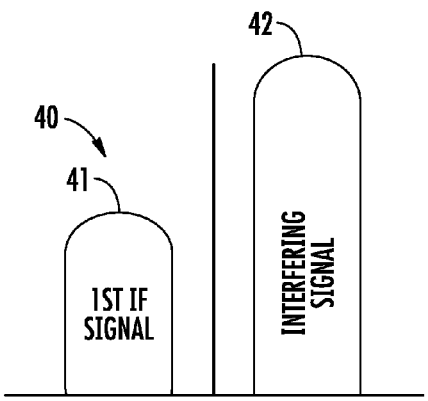
FIG. 3A is a schematic spectral graph of a first intermediate frequency signal and an interfering signal, in accordance with the present disclosure.
Figure 3B:
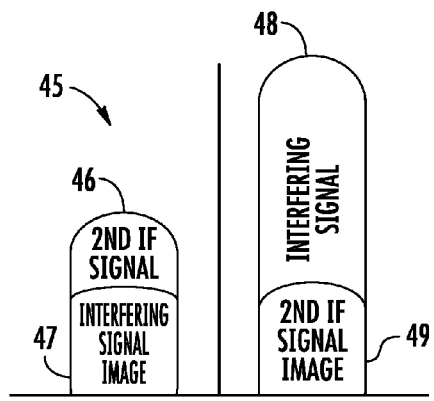
FIG. 3B is a schematic spectral graph of a second intermediate frequency signal and an interfering signal, in accordance with the present disclosure.

As explained earlier, it is undesirable for images of the input signal opposite in sign and in the same band to be created during downconversion to the first intermediate frequency, resulting in the first interfering images. This situation is depicted in the graph 40 of FIG. 3A, where an interfering signal 42 opposite in sign to the first IF signal 41 and in the same band has been created during downconversion of the input signal to the first IF.

This is undesirable because, during downconversion of the input signal to the second intermediate frequency, and therefore generation of a second IF signal, the first interfering images from the downconversion to the first intermediate frequency results in images opposite in sign and in the same band. These second interfering images may therefore have a same sign as the second IF signal, and may be in the same band. This situation is shown in the graph 45 of FIG. 3S, where there is an interfering signal image 47 having a same sign and being in the same band as the second IF signal 46. Since a filter may not be able to remove the interfering signal image 47, system performance is decreased, and the signal to noise ratio (SNR) of the receiver may be unacceptable.

Consequently, to address this situation, it is desirable for the first interfering images to have a same sign as the first IF signal and to not be in the same band. If such first interfering images can be obtained, then the second interfering images will be opposite in sign to the second IF signal, and can be easily filtered out, greatly increasing the performance and SNR of the receiver.

Figure 4A:
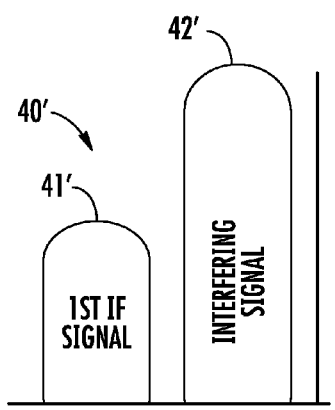
FIG. 4A is a schematic spectral graph of a first intermediate frequency and an interfering signal after the controller of FIG. 1 sets the local oscillators.
Figure 4B:
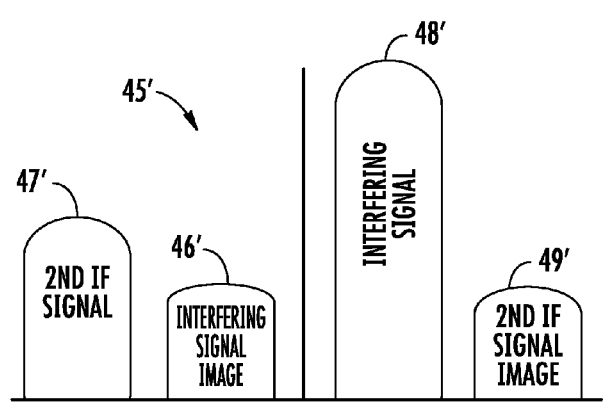
FIG. 4B is a schematic spectral graph of a second intermediate frequency and an interfering signal after the controller of FIG. 1 sets the local oscillators.

The receiver 10 accomplishes this via the controller 30, which sets the second LO 32 and first LO 17 such that the first IF signal and the interfering signal generated due to the phase imbalance have a same sign and non-overlapping bands at an input to the complex mixer 22. The graph 40' of FIG. 4A shows this, with the first IF signal 41' and the interfering signal 42' having a same sign and non-overlapping bands. Consequently, the images generated by downconverting the first IF frequency to the second IF frequency, the interfering signal image 46' and the second IF signal image 49', do not overlap the second IF signal 47'. Therefore, these unwanted images may be filtered out by the filter 24.

Figure 2:
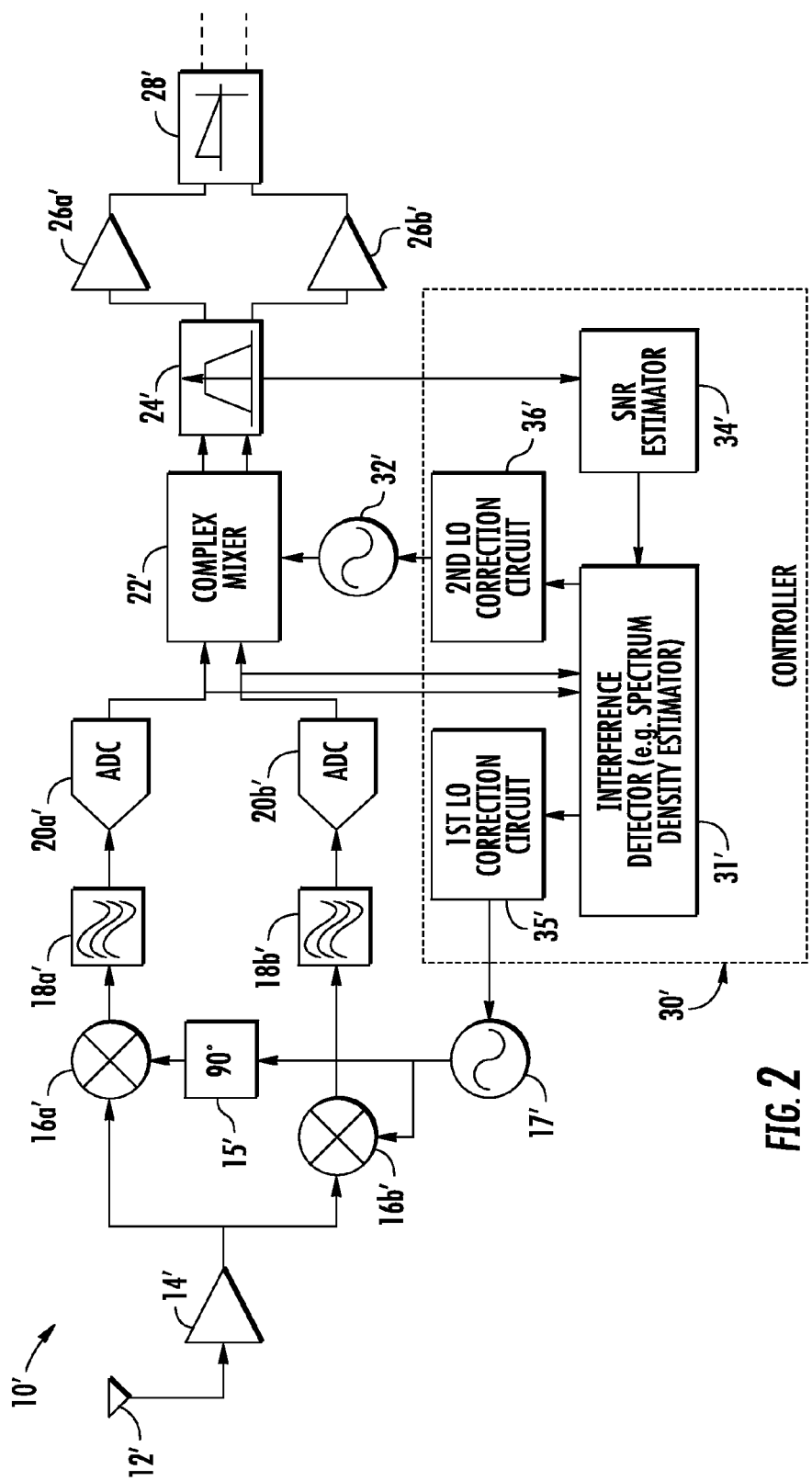
FIG. 2 is a more detailed block diagram of a receiver in accordance with the present disclosure.

With reference to FIG. 2, further details of the controller 30' are now described. The controller 30' comprises an interference detector 31', such as a spectrum density estimator, cooperating with an SNR estimator 34'. The SNR estimator 34' is coupled to the filter 24', is configured to determine the SNR of the second IF signal after filtering, and passes the SNR to the interference detector 31'. The interference detector 31' is coupled to the ADCs 20a', 20b', as well as first and second LO correction circuits 35', 36', and is configured to determine the presence of interfering signals on the output of the ADCs. The first LO correction circuit 35' is coupled to the first LO 17', and similarly the second LO correction circuit 36' is coupled to the second LO 32'. The first and second LO correction circuits 35', 36' cooperate to set the first and second LOs 17', 36' such that the first IF signal and the interfering signal generated due to the phase imbalance have a same sign and non-overlapping bands at an input to the complex mixer 22'.

As will be appreciated by those of skill in the art, the first LOs 17, 17' and second LOs 32, 32' may each be part of a phase locked loop (not shown). In addition, it should be understood that some of the illustrated components, such as the ADCs 20a, 20a', 20b, 20b' may not be necessary, and that the embodiments herein should not be limited to the components shown.

Those skilled in the art will appreciate that the present disclosure includes methods of making and operating the receivers 10, 10' described above.

Exemplary components that may be used in various embodiments of the above-described electronic device are now described with reference to an exemplary mobile wireless communications device 1000 shown in FIG. 5. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 5:
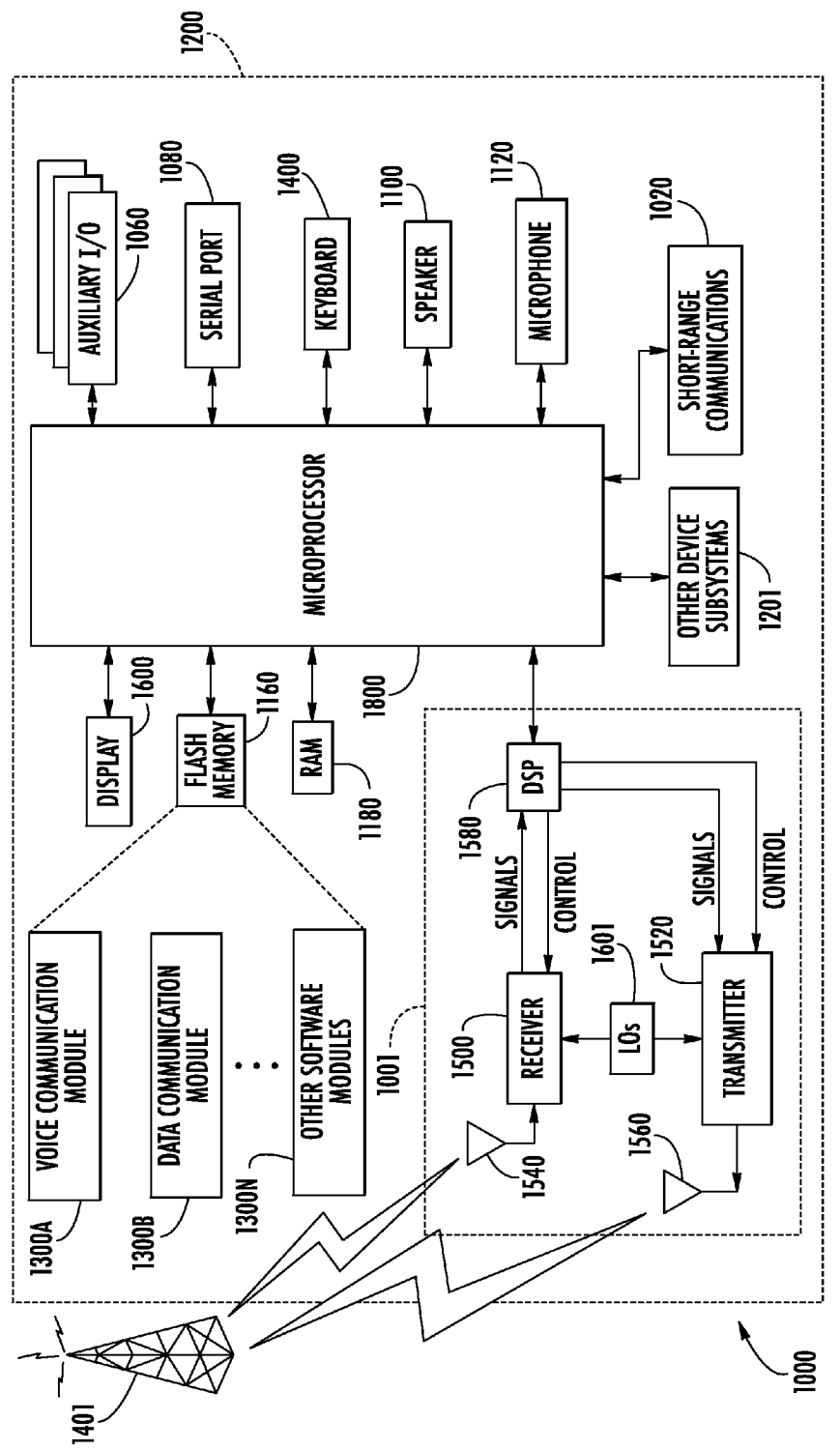
FIG. 5 is a schematic block diagram illustrating example components of a mobile wireless communications device that may include the receiver in FIGS. 1-2.

In addition to the processing device 1800, other parts of the mobile wireless communications device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A receiver comprising:
a first local oscillator (LO);
a pair of in-phase and quadrature (IQ) mixers coupled to said first LO and configured to generate complex IQ signals having an IQ imbalance;
a second LO;
a complex mixer coupled to said second LO and configured to mix the complex IQ signals and generate intermediate frequency (IF) signals based thereon; and
a controller coupled between said pair of IQ mixers and said complex mixer and configured to set said first LO and said second LO so that the complex IQ signals and an interfering signal generated due to the IQ imbalance of the complex IQ signals have a same sign and non-overlapping bands at an input of said complex mixer.

2. The receiver of claim 1, wherein said controller comprises an interference detector.

3. The receiver of claim 2, wherein said controller further comprises a signal to noise ratio (SNR) estimator cooperating with said interference detector and coupled downstream of said complex mixer.

4. The receiver of claim 2, wherein said interference detector comprises a spectrum density estimator.

5. The receiver of claim 1, further comprising at least one analog to digital converter (ADC) downstream from said pair of IQ mixers and upstream of said complex mixer.

6. The receiver of claim 1, further comprising a low noise amplifier coupled upstream from said pair of IQ mixers.

7. The receiver of claim 1, further comprising a low pass filter coupled downstream of said second LO.

8. The receiver of claim 7, further comprising an amplifier coupled downstream of said low pass filter.

9. The receiver of claim 8, further comprising a demodulator coupled downstream of said amplifier.

10. A receiver comprising:
a first local oscillator (LO);
a pair of in-phase and quadrature (IQ) mixers coupled to said first LO and configured to generate complex IQ signals having an IQ imbalance;
a second LO;
a complex mixer coupled to said second LO and configured to mix the complex IQ signals and generate intermediate frequency (IF) signals based thereon; and
a controller comprising
an interference detector coupled between said pair of IQ mixers and said complex mixer, and
a signal to noise ratio (SNR) estimator coupled downstream of said complex mixer,
said controller configured to set said first LO and said second LO so that the complex IQ signals and an interfering signal generated due to the IQ imbalance of the complex IQ signals have a same sign and non-overlapping bands at an input of said complex mixer.

11. The receiver of claim 10, wherein said interference detector comprises a spectrum density estimator.

12. The receiver of claim 10, further comprising at least one analog to digital converter (ADC) downstream from said pair of IQ mixers and upstream of said complex mixer.

13. The receiver of claim 10, further comprising a low noise amplifier coupled upstream from said pair of IQ mixers.

14. The receiver of claim 10, further comprising a low pass filter coupled downstream of said second LO.

15. The receiver of claim 14, further comprising an amplifier coupled downstream of said low pass filter.

16. The receiver of claim 15, further comprising a demodulator coupled downstream of said amplifier.

17. A method of operating a receiver comprising a pair of in-phase and quadrature (IQ) mixers coupled to a first local oscillator and configured to generate complex IQ signals having an IQ imbalance, and a complex mixer coupled to a second LO and configured to mix the complex IQ signals and generate intermediate frequency (IF) signals based thereon, the method comprising:
setting the first LO and the second LO so that the complex IQ signals and an interfering signal generated due to the IQ imbalance of the complex IQ signals have a same sign and non-overlapping bands at an input of the complex mixer, using a controller coupled between the pair of IQ mixers and the complex mixer.

18. The method of claim 17, wherein the controller comprises an interference detector.

19. The method of claim 18, wherein the controller further comprises a signal to noise ratio (SNR) estimator cooperating with the interference detector and coupled downstream of the complex mixer.

20. The method of claim 18, wherein the interference detector comprises a spectrum density estimator.

* * * * *